June 25, 1968  C. H. TIDWELL  3,389,725
TABLE SAW GUIDE
Filed Feb. 3, 1966
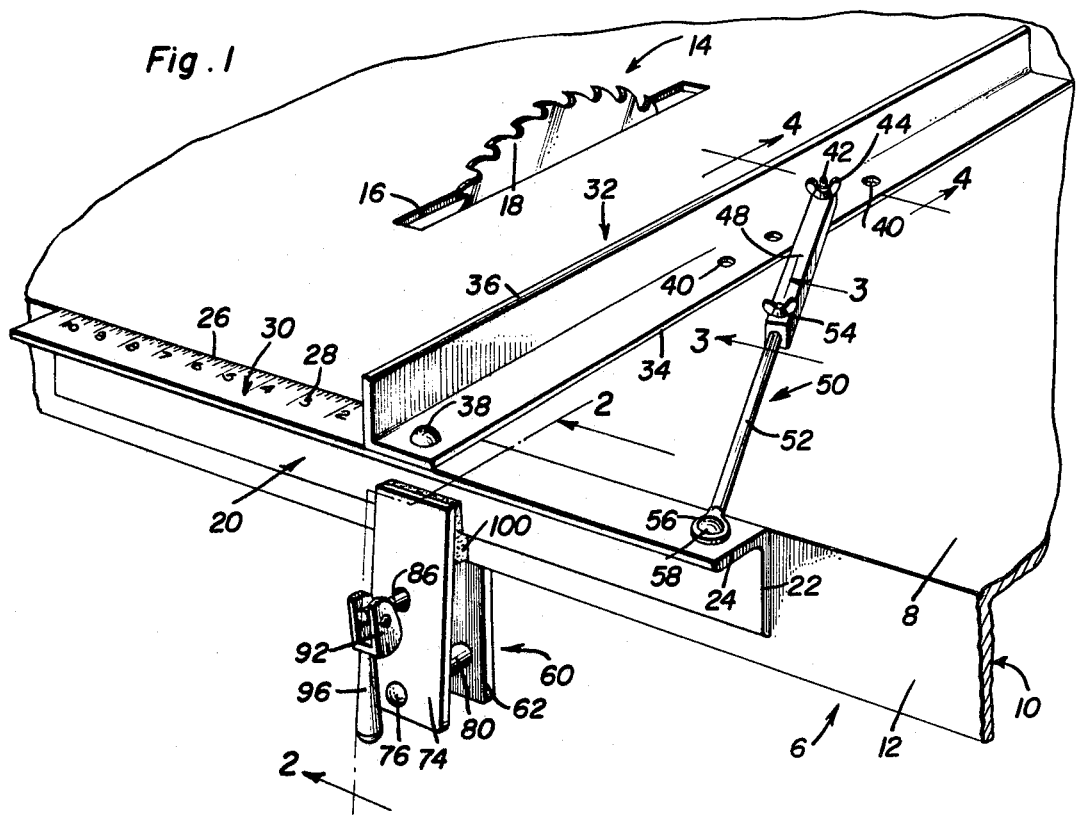
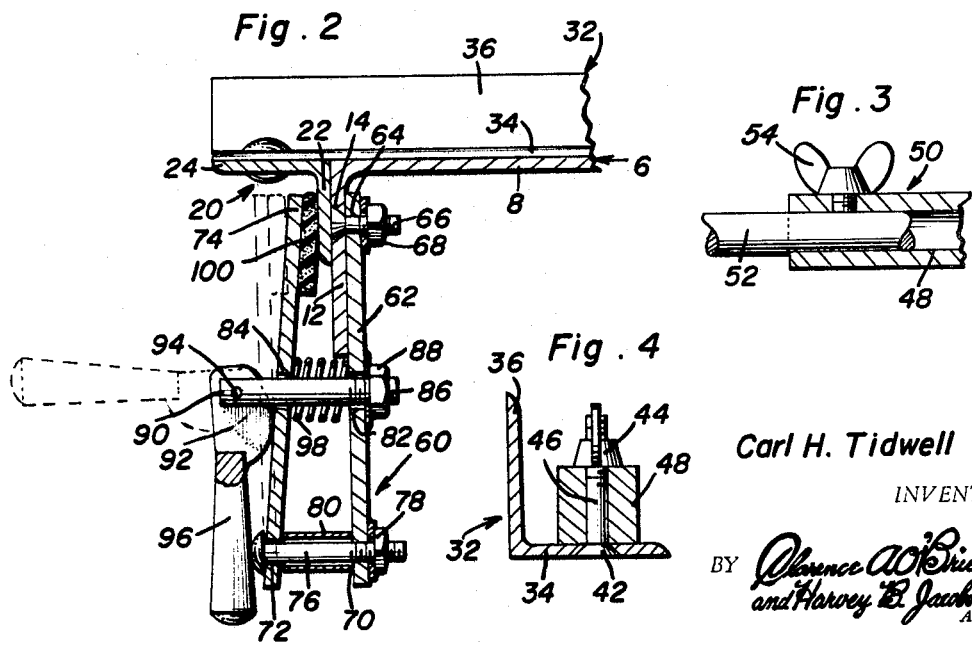
Carl H. Tidwell
INVENTOR.
BY Clarence A. O'Brien
and Harvey B. Jacobson
Attorneys

United States Patent Office 3,389,725
Patented June 25, 1968

3,389,725
TABLE SAW GUIDE
Carl H. Tidwell, Rte. 3, Bon Aqua, Tenn. 37025
Filed Feb. 3, 1966, Ser. No. 524,940
8 Claims. (Cl. 143—169)

ABSTRACT OF THE DISCLOSURE

The invention shown lends itself to use on any make or model of a table saw providing it has a depending rim-like flange of the type illustrated. A simple and practical twin jaw spring-opened and cam-closed clamp has one jaw bolted to an interior surface of the flange so that the other jaw can clampingly engage one of the legs of the T-shaped work guide. This guide embodies a first angle iron bodily attachable and detachable and held against the flange by a jaw of the clamp. The other angle iron or leg rests atop the work surface in a position cooperable with the power driven saw. Linkage means provides an adjustable connection between the horizontal flanges of the two angle irons.

---

The present invention relates to a conventional-type powered sawing machine generally referred to in the prior art and trade as a table saw and pertains, more particularly, to timber and equivalent workpiece stabilizing and guide means which lends itself to feasible and practical use on a saw-equipped table having a marginally bordering depending rim or frame and which requires but a single bolthole in the front frame member for an easy-to-install clamp.

Anyone conversant with the state of the prior art to which the present invention relates can be assumed to be conversant with the fact that many and varied forms and styles of timber gauges and guides have been devised for use on power-type table saws. One such prior art adaptation is shown and described in Hauck's Patent 1,573,705. Another type is shown in a patent to Van Dam et al. 2,562,246. These two prior patents are being voluntarily cited here to enable the reader, if so desired, to refer thereto for general background information.

It is an object of the present invention to structurally, functionally and in other ways improve upon the timber and workpiece guides of the aforementioned patents and, in so doing, to provide an improved adaptation which, it is believed, constitutes a significant advance and improvement in the art. To this end and as will be hereinafter more clearly understood, the present invention is of the utmost in simplicity in construction and is such that the angle members which are utilized in devising and perfecting the substantially T-shaped means enables the user to speedily apply and remove said means and, what is also important, facilitates the step of shifting and adjusting the guide means toward and from the rotary saw.

Briefly summarized, the present invention is characterized by a saw table having the usual horizontally flat work surface provided with a slot for a rotary saw, a power operated saw operatively supported on the table, rotatable in the slot, and having a segmental portion which projects upwardly and adjustably through and beyond the slot as well as the work surface. The table embodies a skirt-like encompassing rim or frame including a linearly straight front member which depends at right angles from the work surface. The quick changeable manually attachable and detachable work positioning and orienting means is the feature of the overall concept. As above suggested, it is generally T-shaped in plan. One leg of this means abuts and is parallel to the front rim or frame member. The other leg resides atop the work surface and is, disposed at right angle to and operatively connected with the first-named leg and is normally parallel with the saw. However, one end is adjustably joined to the first leg and this arrangement permits the angularity of the work guide leg to be changed relative to the position of the saw blade. The invention also features a manually actuatable clamp referred to broadly as clamping means. This means is carried by the front frame member. It is equipped with gripping and retaining means for one leg and is such in construction that it requires but a single bolthole in the front frame member to adapt the latter to accomplish the simplified purposes desired.

More specifically, novelty is predicated on a clamping device. This device comprises a pair of opposed substantially duplicate elongated plates or cleats. These cleats are joined together by a bolt and are freely movable and constitute jaws. One jaw has its upper end bolted to the rim of the table, that is, the aforementioned front frame member. The other jaw serves to grip a depending flange of a coacting angle member. Spring means is interposed between the jaws to separate the same and a handle-equipped cam serves to press the jaws together to obtain the desired clamping result.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fragmentary portion of a conventional table saw and showing, what is more significant, the T-shped applicable and removable guide and gauge attachment and the simple dual-type clamping means all cooperatively associated for the result desired;

FIGURE 2 is a section on an enlarged scale taken on the plane of the section line 2—2 of FIGURE 1;

FIGURE 3 is a fragmentary detail section on the line 3—3 of FIGURE 1; and

FIGURE 4 is a section on the line 4—4 of FIGURE 1.

The table is denoted generally by the numeral 6 in FIGS. 1 and 2 and has the usual planar top with a work surface 8 and a depending apron-like rim or frame as at 10. The "frame" is here represented by the depending front frame member 12 and the only alteration of this component part is the provision of a bolthole 14 therein as shown in FIG. 2. The rotary power driven saw (not detailed) is of conventional construction and is denoted at 14 in FIG. 1 and is operable in a slot 16. More specifically, the segmental portion 18 extends upwardly through and beyond the slot. In actual practice the saw blade can be raised and lowered and this is mentioned here to bring out a point to be referred to later on.

Reference will be made first to the manually applicable and removable guide and gauge means which is referred to, as an entity, by the numeral 20. As best shown in FIG. 1, this means is generally T-shaped in plan, that is, when it is being used in the manner shown in FIG. 1. More specifically, the means comprises a first angle iron which may be considered as the head of the T. This angle iron has a vertical leg or flange 22 which resides in contact with the frame member 12 and has a horizontal leg or flange 24 the lefthand end portion of which is calibrated as at 26 and provided with suitable coordinating printed numerals 28 thus defining a measuring and positioning scale 30 for the other leg or angle iron 32. For distinction the first component part 20 may be designated as a first leg and the component part 32 as a second leg. The horizontal flange 34 resides atop the work surface 8 and the vertical flange 36 is parallel to and provides a timber guide and gauge for the saw. The lefthand end portion of the flange 34 is superimposed on the median portion of the flange 24 and is pivotally connected thereto as denoted at 38. This flange 34 is also provided with selectively usable boltholes 40 for reception of a bolt 42 (see FIG. 4) which is provided with an assembling and clamping thumb nut 44. This bolt and nut are associated with a bolthole 46 provided therefor in the elongated rectangular socketed member 48. This member constitutes one of the parts of an extensible and retractable stay denoted generally at 50. The rod member 52 of the stay is fitted telescopingly into the socket in the manner shown in FIG. 3 and is held by a setscrew 54. The flattened eye-equipped end 56 is superimposed upon and connected by a screw or the like 58 to the flange 24 in the manner shown in FIG. 1.

The adaptable clamping and retaining means for this T-shaped guide and gauge means is denoted generally by the numeral 60 in FIGS. 1 and 2. One rectangular plate or cleat 62 has a bolthole 64 (FIG. 2) therefor to accommodate the bolt 66 and assembling nut 68 thus providing the desired manner of mounting this component of the clamp on the flange 12. The lower end portion of the plate is provided with a bolthole 70 registering with a companion bolthole 72 in the lower end of the companion cleat or plate 74. A bolt 76 passes through these boltholes, is held in place by a nut 78 and is provided with a spacing sleeve 80. The intermediate holes 82 and 84 in these plates serve to accommodate a second bolt 86 held in place by an assembling nut 88 at the righthand end. This bolt has its opposite end 90 extending through and beyond the hole 84 to accommodate the spaced parallel cam members 92 pivoted in place thereon as at 94. The cam is provided with a handle 96 which bears against the plate or cleat 74 and serves to compress the coiled expansion spring 98 which is interposed between the centrally apertured portions of the two plates 62 and 74. The numeral 100 designates a rubber or an equivalent compressibly resilient jaw face which is connected to the coacting upper end of the jaw plate 74. Thus it will be seen that the clamp comprises a pair of opposed jaws assembled and connected together with bolting and spring means with the spring urging the jaws normally apart and with the clamp suspended by a simple bolt 66 carried by the aforementioned front frame member 12. This construction provides an ideal manner of mounting and retaining the T-shaped guide and gauge means (FIG. 1) in place with requisite nicety and adaptability as brought out in FIG. 1.

It is believed that the manner of attaching and using the clamp means 60 and also the T-shaped guiding and gauging means characterized by the legs 20 and 32 and adjustable stay means 50 is evident from the views of the drawing and the description. It is to be pointed out, however, that the construction shown also makes it possible for one to use the invention in conjunction with the saw table and accomplishing what is generally referred to in the trade as "concaving".

The adjustable mechanism running from the guide bar itself to the metal piece clamped against the frame is constructed so that it can be adjusted and the guide bar set at a predetermined angle with the saw. The user then lowers the saw blade to the point where it only extends a fraction of an inch or so above the saw table top. He then places his board "face down" on top of the table and runs it across the top of the saw at a slight angle. The saw saws a "trench" down the center of the board. The trench depth is governed by the height of the saw blade (and the number of passes the board makes over the saw) and the width of the trench is governed by the angle of the guide bar.

It is believed that the invention well serves the purposes for which it is intended. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a conventional-type timber or equivalent workpiece supporting and sawing machine comprising: a saw table having a horizontally flat stationary work surface provided with a slot for a rotary saw, a power operated disk saw operatively mounted on said work surface, rotatable in said slot, and having a segmental portion projecting upwardly through and adjustably above said slot and work surface, respectively, said table embodying a marginally encompassing depending frame including a straight front frame member depending vertically at 90° below the plane of said work surface, manually attachable and detachable work positioning and retaining means, said means being bodily applicable to and removable from said table and being normally T-shaped in plan when in use atop said table, said means embodying a first leg abutting and being parallel to an exterior surface of said front frame member, and a second leg complemental to and residing atop said work surface and disposed at right angles to and operatively connected with a medium portion of said first leg and being normally parallel to said saw, and manually actuatable clamping means independent of said first-named means, secured to and wholly supported by said front frame member and retentively but releasably gripping and retaining said first leg in a given position of use on said table, said second leg constituting a straightedge and accordingly providing a guide and gauge for the timber or other workpiece which is guidingly fed to the saw to be sawn.

2. The combination according to claim 1, and wherein said second leg comprises an angle iron having a horizontal flange residing flatwise on said work surface, and a companion vertical upstanding flange opposed to and confronting the projecting portion of said saw and providing an abutment against which the coacting surface of the workpiece can be guidingly moved as it is fed toward and against the cutting edge of the saw.

3. The structure according to claim 2, and wherein said first leg also comprises an angle iron substantially the same in construction as said first-named angle iron and having its vertical flange bearing against the exterior side of said front frame member, and its horizontal flange flush with and projecting outwardly beyond said front frame member, the horizontal flange of said second leg resting atop and being pivotally connected with the horizontal flange of said first leg.

4. The structure according to claim 3 and, in combination, longitudinally extensible and retractable stay means comprising one component part detachably and adjustably connected with a median portion of the horizontal flange of said second leg, a second component portion pivotally connected at a forward end to a horizontal flange of the first leg, the adjacent ends of said component parts being telescopingly and adjustably connected together.

5. The structure according to claim 1 and wherein said clamping means comprises a self-contained readily attachable and detachable clamping device, said device embodying a pair of opposed susbtantially duplicate elongated cleats, said cleats being bolted together but freely movable relative to each other and constituting jaws, one jaw having its upper end bolted to the rim of the table, that is, the aforementioned frame member, the other jaw serving to grip a depending flange of said one leg.

6. The structure according to claim 5 and wherein said cleats have corresponding lower ends joined together by a bolt piercing respective cleats, there being a spacing sleeve between the cleats and encircling said bolt.

7. The structure according to claim 5 and wherein said cleats have corresponding lower ends joined together by a bolt piercing the respective cleats, there being a spacing sleeve between the cleats and encircling said bolt, and coil spring means of an expansion type interposed between median portions of the cleats and serving to spread the cleats normally apart, and handle-equipped cam means cooperating with an adjacent one of said jaws and serving to press said jaws together to achieve the leg clamping and holding result desired.

8. In combination, a work table having a horizontally flat work surface, said table embodying a marginally encompassing depending rim-like frame, said frame including a straight front member depending vertically at 90° below the plane of the aforementioned work surface, manually actuatable and controllable clamp means comprising a pair of opposed substantially duplicate elongated cleats, said cleats having corresponding lower ends joined together by a bolt piercing the respective lower ends, a spacing sleeve encircling said bolt and interposed between said lower ends, a second bolt passing through median portions of the respective cleats and having one end adjustably connectible with the adjacent cleat, the other end being provided with a handle-equipped cam cooperable with the adjacent cleat, the upper ends of said cleats providing jaws, one of said jaws being bolted to an interior surface of the aforementioned front frame member, the other jaw being adjustable toward and from the exterior surface of said frame member, and, in combination, manually attachable and detachable work positioning means bodily applicable to and removable from said table and normally T-shaped in plan when being used, a first angle iron abutting and parallel to and contacting said front frame member and adapted to be held removably and adjustably in place by the cooperating jaw, a second angle iron residing atop said work surface and having one end pivotally connected to a median portion of said first angle iron, and, stay means embodying component parts one detachably connected with said second angle iron and the other pivotally connected with a co-operating end portion of said first-named angle iron.

References Cited
UNITED STATES PATENTS

| | | | |
|---|---|---|---|
| 1,573,705 | 2/1926 | Hauck | 143—168 |
| 2,822,834 | 2/1958 | Hammers | 143—174 XR |
| 2,690,775 | 10/1954 | Tracy | 143—174 |

WILLIAM W. DYER JR., *Primary Examiner.*

W. D. BRAY, *Assistant Examiner.*